United States Patent [19]
Brassart et al.

[11] Patent Number: 6,061,377
[45] Date of Patent: May 9, 2000

[54] LIGHT AMPLIFIER DEVICE WITH TWO INCIDENT BEAMS

[75] Inventors: Gilles Brassart, Orsay; Thierry Fayette, Grigny; Eric Mottay, Fontenay le Vicomte; Jean-Pierre Treton, Lisses, all of France

[73] Assignee: Thomson-CSF, Paris, France

[21] Appl. No.: 08/984,946

[22] Filed: Dec. 4, 1997

[30] Foreign Application Priority Data

Dec. 4, 1996 [FR] France ................................. 96 14853

[51] Int. Cl.⁷ ....................................................... H01S 3/06
[52] U.S. Cl. ................................ 372/66; 372/75; 372/36; 372/92
[58] Field of Search ............................... 372/66, 75, 36, 372/92

[56] References Cited

U.S. PATENT DOCUMENTS 3,307,113  2/1967  Hughes ................................ 359/347
5,872,804  2/1999  Kan et al. ............................. 372/75

FOREIGN PATENT DOCUMENTS 0 377 206  7/1990  European Pat. Off. .
WO 94/24734  10/1994  WIPO .

OTHER PUBLICATIONS

Patent Abstracts of Japan, vol. 10, No. 197 (E–418) [2253], Jul. 10, 1986 and JP 61 040073, Feb. 26, 1986.

*Primary Examiner*—James W. Davie
*Attorney, Agent, or Firm*—Oblon, Spivak, McClelland, Maier & Neustadt, P.C.

[57] ABSTRACT

A light amplifier device comprises an amplifier medium plate consisting of an upper part comprising two lateral faces (11) and (12) and a lower part comprising two lateral faces (13) and (14), the lateral faces (11) and (13) being located on a first face of the amplifier medium, the lateral faces (12) and (14) being located on a second face of the amplifier medium opposite said first face, at least two light beams (2) and (2') amplified by the amplifier medium and optical pumping means of said amplifier medium, wherein the light beam (2) is introduced into the amplifier medium at a lateral face (11) or (12) and the light beam (2') is introduced into the amplifier medium at a lateral face (13) or (14). The faces (11) and (12) are antiparallel to each other, the faces (13) and (14) being also antiparallel to each other. Application to power lasers.

10 Claims, 6 Drawing Sheets

LIGHT AMPLIFIER DEVICE WITH TWO INCIDENT BEAMS

BACKGROUND OF THE INVENTION

1. Field of the Invention

The field of the invention is that of amplifier devices and especially power lasers.

At present, amplification devices generally comprise an amplifier medium, an optical pumping system and a cooling device.

The pumping system is provided by power laser diodes. This mode of pumping is more efficient than optical pumping by flash lamps. At the present time, the laser diodes, which take the form of linear arrays of aligned unitary emitters, have high luminance values. As for the diodes that emit in pulsed mode, the stacking of the linear arrays provides for architectures of amplifier structures with high integration rates.

To store high light energy per unit cf volume in the amplifier media and reduce the effects induced by the thermal load, it is preferred, rather than conventional cylindrical bars, to use parallelepiped plates whose dimensions depend on the desired luminous performance characteristics.

2. Description of the Prior Art

In the prior art, light amplifier devices comprise an amplifier medium plate working with one or two incident beams, means for the pumping of the amplifier medium, the amplifier medium plate possessing two lateral faces that are parallel to each other. FIG. 1 shows a prior art configuration comprising a light beam 2, an amplifier medium 1, optical pumping means 3 and cooling means 4. The faces 01 and 02 are cut so as to be parallel and are polished so that the entry and exit of the lateral beam 2 into and from the plate occurs at the Brewster angle of incidence. The value of the tangent of the angle of incidence i is equal to the refraction index n of the medium at the wavelength of light. The angle of incidence i is linked to the refraction angle r by the following formula: $i+r=\pi/2$.

The length L of the plate is defined as a function of its thickness e and of the even number 2.N of rebounds made by the beam in total reflection within the medium:

$$L=2.N.e.\cotan(i-r)$$

The pumping means 3, which are typically diodes, are usually placed on one of the main lateral faces of the plate while the cooling device 4 is placed on the other main lateral face.

In a configuration of this kind, owing to the parallel faces 01 and 02, the image of an object through the plate is seen in the same direction as the object. For many applications, this is a drawback. This is why the invention proposes to overcome this problem by proposing a high-performance amplifier device and by delivering an image inversion.

SUMMARY OF THE INVENTION

More specifically, an object of the invention is a light amplifier device comprising an amplifier medium plate 1 consisting of an upper part comprising two lateral faces 11 and 12 and a lower part comprising two lateral faces 13 and 14, the lateral faces 11 and 13 being located on a first face of the amplifier medium, the faces 12 and 14 being located on a second face of the amplifier medium, opposite said first face, at least two light beams 2 and 2' amplified by the amplifier medium and optical pumping means 3 of said amplifier medium, wherein:

the light beam 2 is introduced into the amplifier medium at a lateral face 11 or 13;

the light beam 2' is introduced into the amplifier medium at the level of a lateral face 12 or 14;

the faces 11 and 12 being antiparallel to each other;

the faces 13 and 14 being antiparallel to each other.

According to a first variant of the invention, the faces 11 and 13 are parallel to each other, the faces 12 and 14 being also parallel to each other. Advantageously, the lateral faces 11, 12, 13, 14 may be cut to the Brewster angle, the light beams 2 and 2' being, in the amplifier medium, in total reflection on the main lateral faces 15 and 16 of the amplifier medium.

According to a second variant of the invention, the faces 11 and 13 are antiparallel to each other, the faces 12 and 14 being also antiparallel to each other. Advantageously, the lateral faces 11, 12, 13 and 14 may be cut to zero incidence with respect to the light beams 2 and 2', the beams 2 and 2' being in maximum reflection on the main lateral faces 15 and 16 of the amplifier medium.

An object of the invention is also an amplifier device with four light beam passages in the amplifier medium. More specifically, this amplifier device comprises means for the creation, from a first incident light beam, of four light beams going through the amplifier medium, means for the changing of the polarization of said first light beam and means for the selection and extraction of one of the polarizations of the light beams generated by the amplifier device.

BRIEF DESCRIPTION OF THE DRAWINGS

The invention will be understood more clearly and other advantages shall appear from the following description, given by way of a non-restrictive embodiment, from the appended figures, of which.

MORE DETAILED DESCRIPTION

In general, the amplifier device according to the invention has an amplifier medium plate, pumping means and cooling means, two light beams to be amplified being introduced into the amplifier medium at the two lateral faces opposite said medium. The length L of the amplifier medium plate is defined as a function of its thickness e and the odd number (2N+1) of rebounds made by the two light beams within the medium.

$$L=(2N+1)e.\cotan(i-r)$$

The image of an object through the plate is thus reversed with respect to an object.

Figure 1:
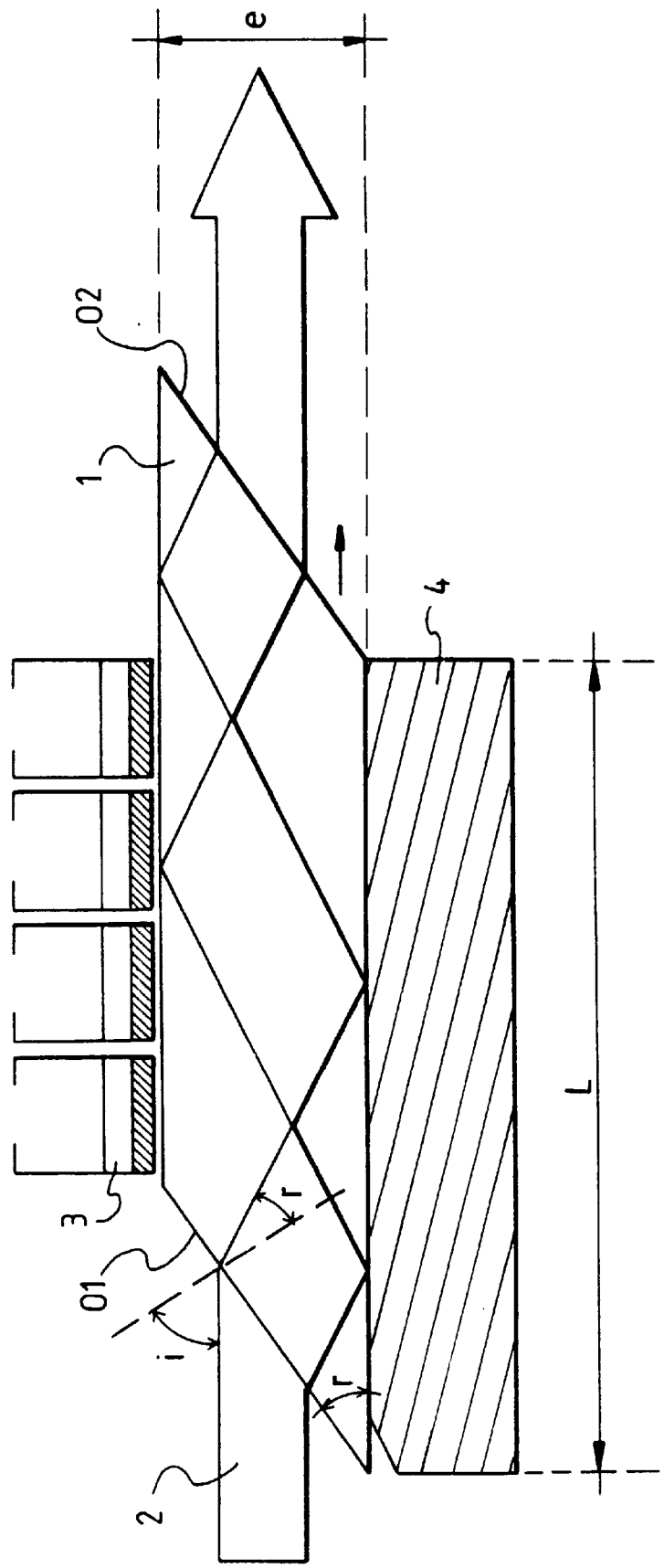
FIG. 1 illustrates a prior art amplifier device.
Figure 2:
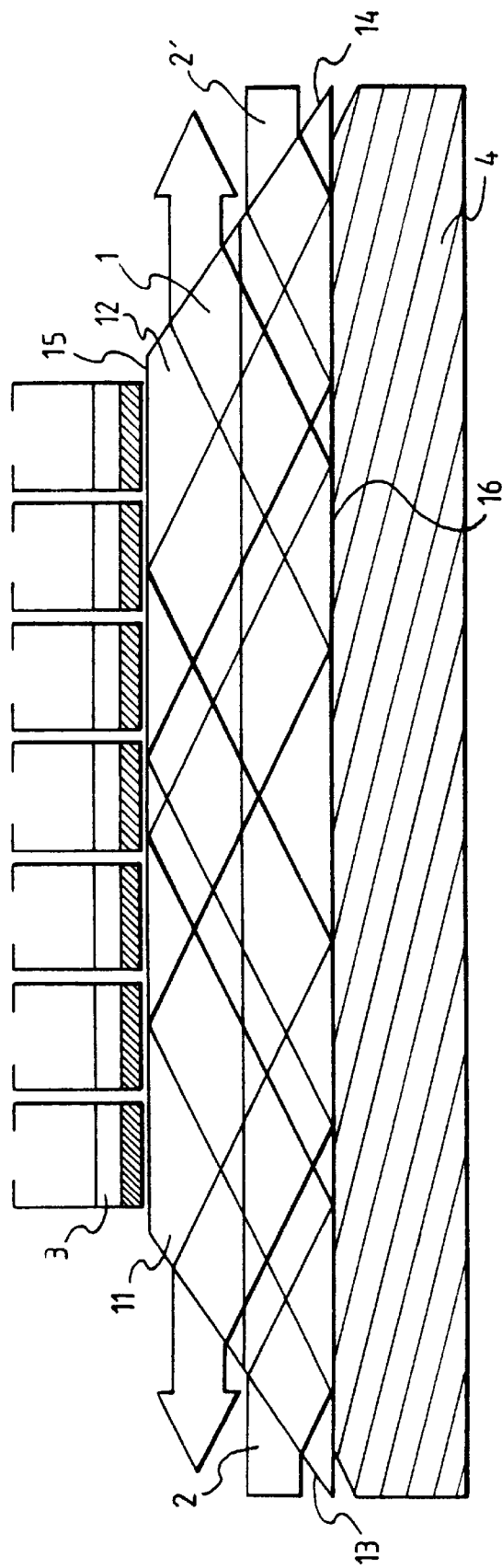
FIG. 2 illustrates a first exemplary amplifier device according to the invention in which the faces 11 and 13 are mutually parallel, the faces 12 and 14 being also mutually parallel.

According to a first variant of the invention shown in FIG. 2, the amplifier medium plate comprises, in its upper part, two antiparallel faces 11 and 12 cut to the Brewster angle and, in its lower part, two faces 13 and 14 that are also antiparallel and cut to the Brewster angle. According to this first variant of the invention, the faces 11 and 13 are located in one and the same plane, the faces 12 and 14 being also located in one and same plane. A first light beam 2 is introduced into the amplifier medium at the face 13 and a second light beam is introduced into the amplifier medium at the level of the face 14. Laser diode type pumping means are located before a main lateral face 15 of the amplifier medium, cooling means being located before a main lateral face 16 of the amplifier medium opposite the face 15.

Figure 3:
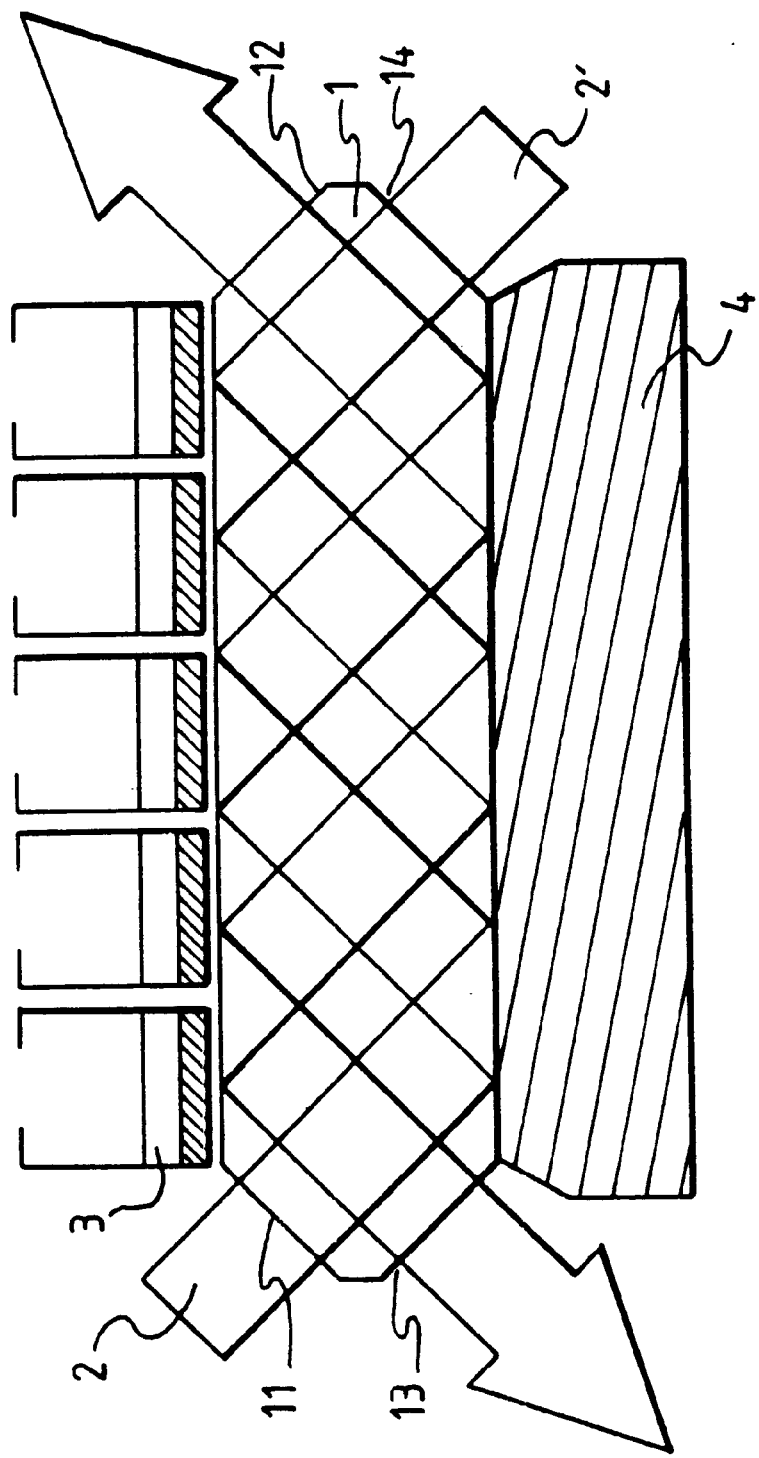
FIG. 3 illustrates a second exemplary amplifier device according to the invention in which the faces 11 and 13 are mutually antiparallel, the faces 12 and 14 being also mutually antiparallel.

According to a second variant of the invention shown in FIG. 3, the faces 11 and 13 are mutually antiparallel, the faces 12 and 14 being also mutually antiparallel. A first light beam 2 is introduced at the face 11, at zero incidence, a second light beam 2' being introduced at the face 14, also at zero incidence. To provide for the maximum reflection of the light beams 2 and 2' on the main faces 15 and 16, within the amplifier medium, these faces 15 and 16 receive dielectric processing adapted so as to facilitate this maximum reflection.

It must be noted that the beams 2 and 2' may also be introduced at any incidence ranging from zero incidence to the Brewster incidence.

Figure 4B:
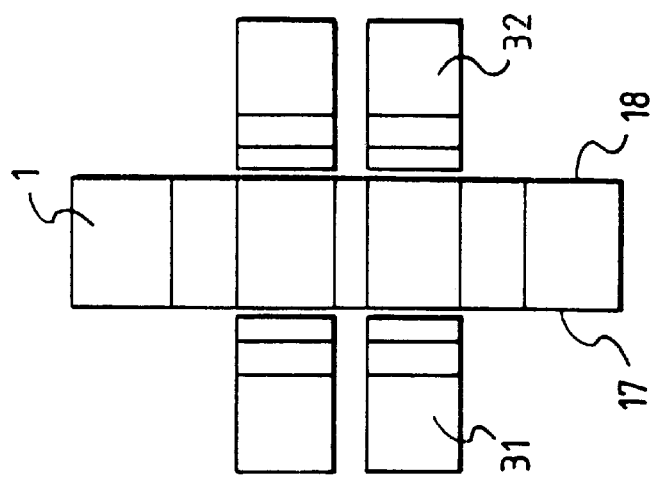
FIG. 4b illustrates a cross-sectional view A—A of FIG. 4a of a third example of the amplifier device according to the invention comprising pumping means before the lateral faces 17 and 18 and cooling means before the faces 15 and 16.
Figure 4A:
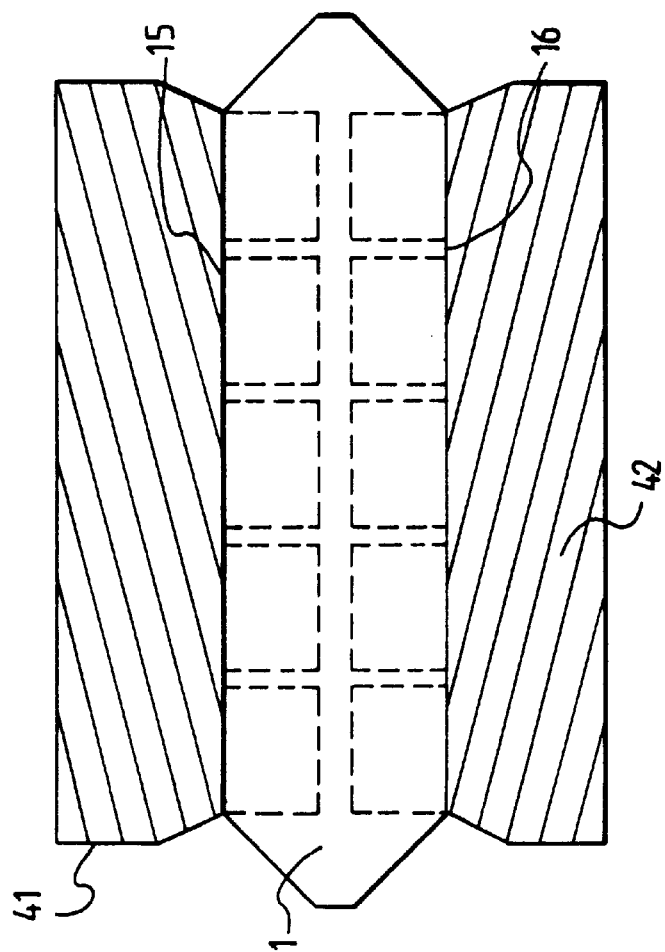
FIG. 4a illustrates a front view of a third exemplary amplifier device according to the invention comprising pumping means before the lateral faces 17 and 18 and cooling means before the faces 15 and 16.

According to a third example of an amplifier device, the cooling means shown in FIGS. 4a and 4b may be duplicated to constitute means 41 and 42 located on either side of the amplifier medium plate, before the main lateral faces 15 and 16. The pumping means may advantageously be duplicated to constitute means 31 and 32 located at the main lateral faces 17 and 18 as illustrated in FIG. 4b.

A configuration of this kind makes it possible to provide for more efficient cooling when it is coupled with a major optical pumping operation requiring powerful cooling means.

Figure 5:
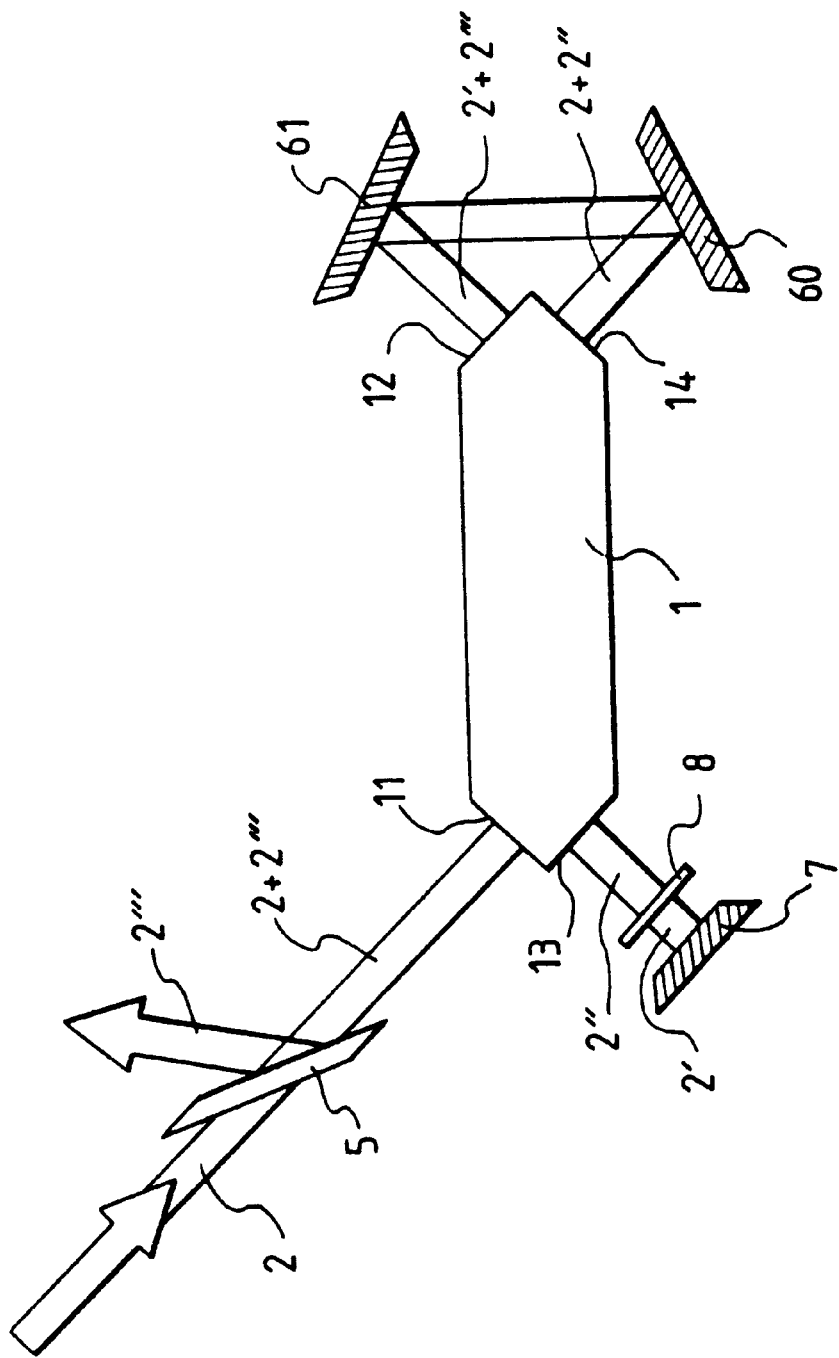
FIG. 5 illustrates a fourth exemplary amplifier device in which the light beams 2 and 2' are created out of a single beam.

According to a fourth variant of the invention, the amplifier device according to the invention may be a four-passage amplifier device as shown in FIG. 5. It uses an amplifier medium plate such as the one shown in FIG. 3, comprising faces 11 and 13 that are antiparallel and faces 12 and 14 that are also antiparallel. A first incident light beam 2 has its direction of polarization of the electrical field parallel to the plane of FIG. 5. It crosses a polarizer 5, enters the amplifier medium 1. At the exit from said amplifier medium, the light beam is reflected on the pair of mirrors 60 and 61. At the exit from the mirror 61, the light beam 2' enters the amplifier medium so as to be reflected by the mirror 7, in passing through a quarterwave plate 8 in a round trip motion. This incident light beam 2" thus generated has a direction of polarization of the electrical field that is normal to the direction of polarization of the light beam 2. This incident light beam 2" which is incident to the amplifier medium plate in turn penetrates said plate to emerge and be reflected by the mirrors 60 and 61 as an incident light beam 2'" superimposed, in FIG. 5, on the light beam 2' but with a direction of polarization that is normal to the direction of polarization of said light beam 2'. At exit, the polarizer 5 ejects the light beam 2'", whose direction of polarization is then perpendicular to the plane of the figure.

By way of an example, depending in the number of stacked diodes used in the amplifier device, the coefficient of amplification of a pulse of some tens of nanoseconds ranges from 50 to 100 if the amplifier medium is made, for example, of neodymium-doped phosphate glass.

It must be noted that any sort of amplifier medium may be used in the device of the invention. The amplifier medium plates may typically have a length of about ten centimeters for a thickness of about ten microns, the extent of the different light beams being about 2 to 3 microns.

Figure 6:
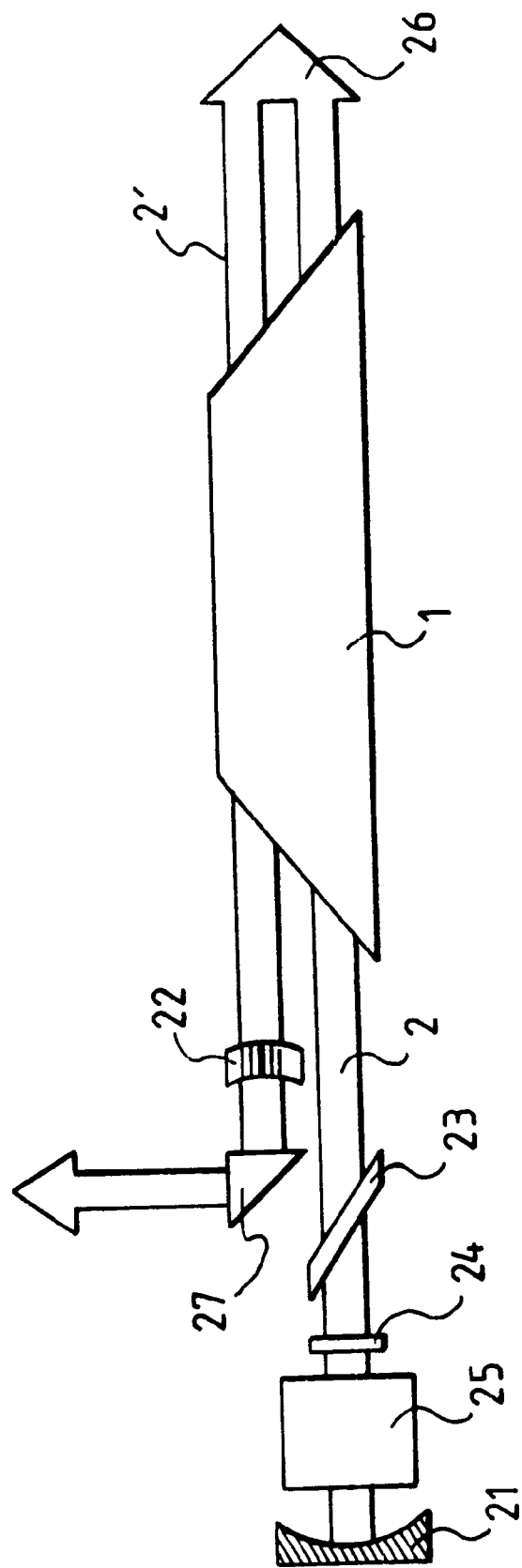
FIG. 6 illustrates an exemplary laser cavity into which an amplifier device according to the invention is integrated.

The amplifier device according to the invention may advantageously be used in resonators prepared for the generation of powerful pulses. FIG. 6 illustrates an exemplary resonator using a configuration of an amplifier device of the invention. The resonator is defined by the set of two mirrors 21 and 22. This mirror 21 provides maximum reflection for the optical beams 2 and 2'. The mirror 22 has variable reflectivity for said beams. The two mirrors have radii of curvature whose value depends on the cavity length and the thermal behavior of the amplifier medium placed in the amplifier device. The resonator is activated by a Pockels cell type optical switch consisting of a polarizer 23, a quarterwave plate 24 and a longitudinal-field Pockels cell 25. An optical square 26 enables the folding of the resonant cavity and generates the light beam 2' at the amplifier medium plate. A prism 27 constitutes the exit optical unit of the cavity.

By using, for example, an amplifier medium plate of the Nd:YAG type and depending on the number of diodes used for optical pumping, the resonator resulting from the cavity described here above is capable of delivering energy propagated by light pulses varying from some millijoules to several hundreds of millijoules for pulse duration values of some nanoseconds to some tens of nanoseconds.

What is claimed is:

1. A light amplifier device comprising an amplifier medium plate consisting of an upper part comprising first and second lateral faces and a lower part comprising third and fourth lateral faces, the first and third lateral faces being located on a first face of the amplifier medium, the second and fourth lateral faces being located on a second face of the amplifier medium opposite said first face, at least first and second light beams amplified by the amplifier medium and optical pumping means of said amplifier medium, wherein:

the first light beam is introduced into the amplifier medium at one of said first and said second lateral faces;

the second light beam is introduced into the amplifier medium at one of said third and said fourth lateral faces;

the first and second faces being antiparallel to each other;

the third and fourth faces being antiparallel to each other.

2. A light amplifier device according to claim 1, wherein the first and third faces are parallel to each other and the second and fourth faces are parallel to each other.

3. A light amplifier device according to claim 1, wherein the first and third faces are antiparallel to each other, and the second and fourth faces are antiparallel to each other.

4. A light amplifier device according to claim 1, wherein the first, second, third and fourth lateral faces are cut to the Brewster angle, the first and second light beams being, in the amplifier medium, in total reflection on the first and second main lateral faces.

5. A light amplifier device according to claim 3, wherein the first, second, third and fourth lateral faces are cut to zero incidence with respect to the first and second light beams, the first and second beams being in maximum reflection on the first and second main lateral faces.

6. A light amplifier device according to one of the claims 1 to 5, comprising pumping means located before one of said first and said second main lateral faces of the amplifier medium plate and cooling means located so as to be facing the other of said first and said second main lateral faces respectively.

7. A light amplifier device according to one of the claims 1 to 5, comprising pumping means located before at least one of third and fourth main lateral faces and cooling means located so as to be facing at least one of said first and second main lateral faces.

8. An amplifier device according to one of the claims 1 to 5, comprising means for the creation, from a first incident light beam, of four light beams going through the amplifier medium, means to change the polarization of said first light beam and means for the selection and extraction of one of the polarizations of the light beams generated by the amplifier device.

9. An optical resonator comprising:

reflection mirrors; and a light amplifier device comprising an amplifier medium plate consisting of an upper part comprising first and second lateral faces and a lower part comprising third and fourth lateral faces, the first and third lateral faces and being located on a first face of the amplifier medium, the second and fourth lateral faces being located on a second face of the amplifier medium opposite said first face, at least first and second light beams amplified by the amplifier medium and optical pumping means of said amplifier medium, wherein the first light beam is introduced into the amplifier medium at one of said first and said second lateral faces, the second light beam is introduced into the amplifier medium at one of said third and said fourth lateral faces, the first and second faces being antiparallel to each other, and the third and fourth faces being antiparallel to each other.

10. An optical resonator according to claim 9, further comprising a longitudinal-field Pockels cell, a quarter-wave plate and a polarizer to activate the optical resonator in a pulsed manner.

* * * * *